(12) United States Patent
Krishnan et al.

(10) Patent No.: US 10,713,107 B2
(45) Date of Patent: Jul. 14, 2020

(54) DETECTING A POSSIBLE UNDERLYING PROBLEM AMONG COMPUTING DEVICES

(71) Applicant: Accenture Global Solutions Limited, Dublin (IE)

(72) Inventors: Mythili Krishnan, Bangalore (IN); Vinita V. Nair, Bangalore (IN); Chriss Acca Mathews, Kottayam (IN); Madhusudhan D T, Jagalur Taluk (IN); Kunal Bhowmick, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 210 days.

(21) Appl. No.: 15/988,904

(22) Filed: May 24, 2018

(65) Prior Publication Data

US 2019/0361760 A1     Nov. 28, 2019

(51) Int. Cl.
*G06F 11/00*     (2006.01)
*G06F 11/07*     (2006.01)
*G06F 16/28*     (2019.01)

(52) U.S. Cl.
CPC .......... *G06F 11/079* (2013.01); *G06F 11/076* (2013.01); *G06F 11/0775* (2013.01); *G06F 11/0787* (2013.01); *G06F 11/0793* (2013.01); *G06F 16/285* (2019.01)

(58) Field of Classification Search
CPC .. G06F 11/079; G06F 11/076; G06F 11/0775; G06F 11/0787; G06F 11/0793; G06F 11/0766; G06F 11/0781; G06F 11/0784; G06F 16/285; G06F 9/453

USPC ............... 714/2, 26, 47; 707/706, 723, 738; 706/12, 46
See application file for complete search history.

(56) References Cited

U.S. PATENT DOCUMENTS

| 8,812,649 B2* | 8/2014 | Adams, Jr. .......... H04L 41/0659 709/224 |
| 2005/0081118 A1* | 4/2005 | Cheston .............. G06F 11/0784 714/47.1 |
| 2010/0318846 A1 | 12/2010 | Sailer et al. |
| 2012/0259962 A1* | 10/2012 | Bose ...................... H04L 41/50 709/223 |
| 2012/0323623 A1* | 12/2012 | Sabharwal ..... G06Q 10/063112 705/7.14 |
| 2014/0129536 A1* | 5/2014 | Anand ................... G06N 7/005 707/706 |

(Continued)

*Primary Examiner* — Anthony J Amoroso
(74) *Attorney, Agent, or Firm* — Harrity & Harrity, LLP

(57) ABSTRACT

A device may process text included in an electronic issue ticket to identify a set of terms or a pattern of terms included in the text. The electronic issue ticket may be related to an issue associated with a computing device. The device may classify the electronic issue ticket into an issue category of a set of issue categories. The set of issue categories may be related to various issues associated with various computing devices. The device may monitor a counter for a set of thresholds associated with the issue category. The device may detect a possible underlying problem among the various computing devices. The device may generate an electronic problem ticket for the possible underlying problem. The device may append the electronic problem ticket with information related to the electronic issue ticket or one or more other electronic issue tickets. The device may perform one or more actions.

20 Claims, 11 Drawing Sheets

(56) References Cited

U.S. PATENT DOCUMENTS

2014/0215624 A1* 7/2014 Suzio .................... H04L 63/145
                                                                   726/23
2014/0325254 A1    10/2014  Mani et al.
2018/0336485 A1* 11/2018  Bikumala ......... G06F 16/24578

* cited by examiner

DETECTING A POSSIBLE UNDERLYING PROBLEM AMONG COMPUTING DEVICES

BACKGROUND

Technical support may refer to one or more services by which an enterprise provides assistance to users of technology products, such as mobile phones, televisions, computers, and/or the like. Technical support services may address specific problems with a product and/or a service rather than the provision of training for those products and/or services, customization of those products and/or services, and/or the like. Technical support may be delivered via email, live support software, a website, a tool where users can log a call or an incident, and/or the like.

SUMMARY

According to some possible implementations, a method may include receiving, by a device, an electronic issue ticket related to an issue associated with a computing device. The method may include processing, by the device, content of the electronic issue ticket utilizing a text processing technique to identify a set of terms included in the content or a pattern of terms included in the content. The content may include: text included in the electronic issue ticket, a categorization of the electronic issue ticket, a priority of the electronic issue ticket, or an identity of the computing device associated with the electronic issue ticket. The method may include classifying, by the device, the electronic issue ticket into an issue category, of a set of issue categories, based on the set of terms or the pattern of terms included in the content of the electronic issue ticket. The set of issue categories may be related to various issues associated with various computing devices. The method may include monitoring, by the device, a respective counter for a set of thresholds associated with the issue category after classifying the electronic issue ticket. The method may include detecting, by the device, a possible underlying problem among the various computing devices after monitoring the respective counter for the set of thresholds. The method may include generating, by the device, an electronic problem ticket for the possible underlying problem after detecting the possible underlying problem. The method may include appending, by the device, the electronic problem ticket with information related to the electronic issue ticket or one or more other electronic issue tickets classified in a same category as the electronic issue ticket. The method may include performing, by the device, one or more actions related to the possible underlying problem after appending the electronic problem ticket with the information.

According to some possible implementations, a device may include one or more memories; and one or more processors, communicatively coupled to the one or more memories, to process text included in an electronic issue ticket utilizing a text processing technique to identify a set of terms included in the text or a pattern of terms included in the text. The electronic issue ticket may be related to an issue associated with a computing device. The one or more processors may classify the electronic issue ticket into an issue category, of a set of issue categories, based on the set of terms or the pattern of terms included in the text. The set of issue categories may be related to various issues associated with various computing devices. The one or more processors may monitor a counter for a set of thresholds associated with the issue category to detect satisfaction of one or more of the set of thresholds. The one or more processors may detect a possible underlying problem among the various computing devices after monitoring the respective counter for the set of thresholds. The one or more processors may generate an electronic problem ticket for the possible underlying problem after detecting the possible underlying problem. The one or more processors may append the electronic problem ticket with information related to the electronic issue ticket or one or more other electronic issue tickets classified in a same issue category as the electronic issue ticket. The one or more processors may perform one or more actions after appending the electronic problem ticket with the information.

According to some possible implementations, a non-transitory computer-readable medium may store one or more instructions that, when executed by one or more processors, cause the one or more processors to process text included in an electronic issue ticket utilizing a text processing technique to identify a set of terms included in the text or a pattern of terms included in the text. The electronic issue ticket may be associated with an issue related to a computing device. The one or more instructions, when executed by the one or more processors, may cause the one or more processors to classify the electronic issue ticket into an issue category, of a set of issue categories, based on the set of terms or the pattern of terms included in the text. The set of issue categories may be related to various issues associated with various computing devices. The one or more instructions, when executed by the one or more processors, may cause the one or more processors to detect a possible underlying problem among the various computing devices based on a respective counter for a set of thresholds. The set of thresholds may be associated with the issue category. The one or more instructions, when executed by the one or more processors, may cause the one or more processors to generate an electronic problem ticket for the possible underlying problem after detecting the possible underlying problem. The one or more instructions, when executed by the one or more processors, may cause the one or more processors to append the electronic problem ticket with information related to the electronic issue ticket or one or more other electronic issue tickets classified in a same category as the electronic issue ticket. The one or more instructions, when executed by the one or more processors, may cause the one or more processors to perform one or more actions after appending the electronic problem ticket with the information. The one or more actions may include providing the electronic problem ticket to a client device associated with a particular team associated with an information technology (IT) support center.

DETAILED DESCRIPTION

Figure 1A:
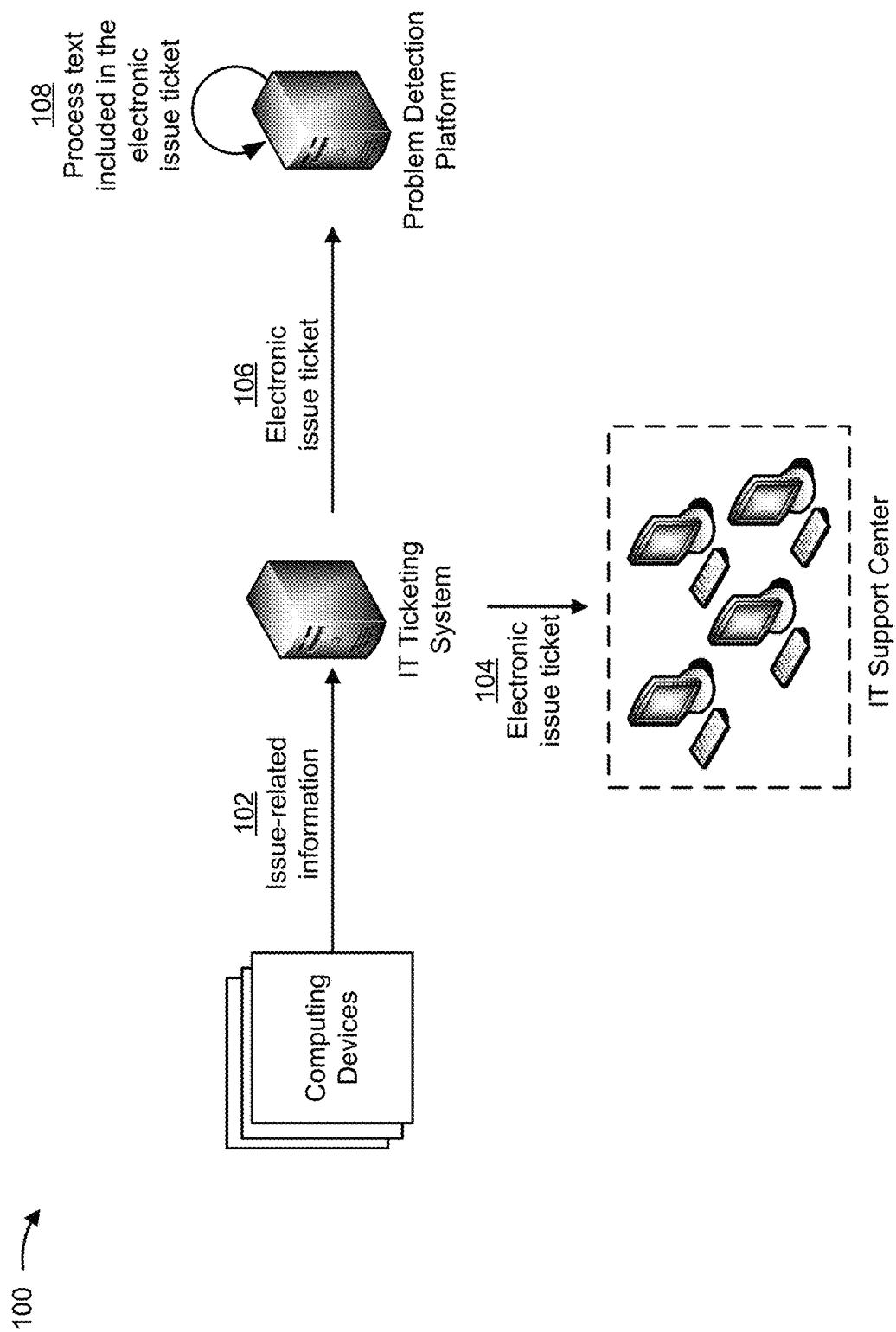
FIGS. 1A-1F are diagrams of an example implementation described herein.

The following detailed description of example implementations refers to the accompanying drawings. The same reference numbers in different drawings may identify the same or similar elements.

An organization may utilize an information technology (IT) ticketing system to provide technical support services to individuals associated with the organization (e.g., employees, customers, vendors, and/or the like). For example, when a computing device associated with the organization (e.g., a client device, a server device, and/or the like) experiences an issue, such as a crashed program, a denial of access to a system, and/or the like, the individual and/or the computing device may communicate with the IT ticketing system to generate an electronic issue ticket for the issue. The IT ticketing system may then communicate with an IT support center to facilitate resolution of the issue. While this process can facilitate resolution of individual issues, the IT ticketing system may lack a capability to analyze issues across thousands, millions, or more computing devices to identify possible underlying problems with the computing devices (e.g., underlying problems which may be causing repetitive occurrence of an issue, which may be causing different issues across different computing devices, and/or the like). This can result in future consumption of resources (e.g., time resources, human resources, computing resources of the IT ticketing system and/or the IT support center, and/or the like) via repetitive occurrence of the same issue, via other issues that occur due to the same possible underlying problem, and/or the like. In addition, downtime of applications, services, and/or the like due to occurrence of an issue can adversely affect operations of an organization and can result in revenue loss if timely remedial action is not taken. This can additionally affect productivity of the organization and/or customer experience.

Some implementations described herein provide a problem detection platform that is capable of analyzing millions, billions, or more electronic issue tickets for millions, billions, or more issues across thousands, millions, or more computing devices to identify possible underlying problems across the computing devices. In this way, the problem detection platform may detect and/or remedy possible underlying problems that may be causing the issues for the computing devices. This conserves computing resources that would otherwise be consumed due to repetitive occurrence of the same issue, due to occurrence of other issues related to the same possible underlying problem, and/or the like. In addition, this conserves computing resources that would otherwise be consumed resolving the same issue multiple times and/or resolving issues related to the same possible underlying problem. Further, this reduces an amount of time needed to identify and/or resolve a possible underlying problem, thereby improving the process of detecting and/or resolving an underlying problem. Further, this provides an end-to-end platform for pro-active problem detection and automatic problem ticket generation.

In addition, in this way, several different stages of the process for detecting a possible underlying problem among computing devices are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to detect a possible underlying problem among computing devices, as described herein. Finally, automating the process for detecting a possible underlying problem among computing devices conserves computing resources (e.g., processor resources, memory resources, and/or the like) that would otherwise be wasted in attempting to detect a possible underlying problem among computing devices using an inferior technique, and computing resources that would be wasted via repetitive occurrence of an issue, via occurrence of multiple issues related to the same possible underlying problem, and/or the like.

Further, in this way, the problem detection platform may generate an electronic problem ticket that includes information related to incidents that caused various electronic issue tickets. This can aid an engineer and/or a technician in analyzing the related incidents for a more efficient resolution of an issue. In addition, this facilitates fixing of a root cause of the electronic problem ticket so that individual electronic issue tickets, for different incidents, do not need to be fixed individually. Further, this prevents future incidents, similar to that which caused the electronic problem ticket, from re-occurring.

FIGS. 1A-1F are diagrams of an example implementation 100 described herein. As shown in FIG. 1A, example implementation 100 includes various computing devices (e.g., client devices, server devices, peripheral devices (e.g., a printer, a copier, and/or the like), and/or the like), an IT ticketing system, an IT support center, and a problem detection platform.

As shown by reference number 102, the computing devices may provide, to the IT ticketing system, issue-related information. For example, the issue-related information may identify issues related to operation of the computing devices (e.g., a program crash, a denial of access to a program and/or a system, a hardware failure, performance degradation, a security-related issue, and/or the like). In some implementations, the computing devices may provide the issue-related information automatically upon occurrence of an issue, based on user input to the computing devices, periodically, according to a schedule, and/or the like. For example, the computing devices may provide the issue-related information in the form of a crash report, an email to a technical support account, a daily or weekly log of issues, and/or the like. In some implementations, the IT ticketing system may receive issue-related information for thousands, millions, or more issues from thousands, millions or more computing devices across dozens, hundreds, or more organizations. In this way, the implementations described herein relate to a set of issues that cannot be analyzed manually or objectively (e.g., in a consistent manner) by a human actor.

In some implementations, the IT ticketing system may generate a respective electronic issue ticket for issues associated with the computing devices based on the issue-related information. For example, an electronic issue ticket may include information that identifies a computing device that experienced an issue, a timestamp for the issue, the issue (e.g., text input by a user of the computing device to describe the issue, a menu item selection that describes the issue, a log of activities that preceded the issue, and/or the like), and/or the like. Additionally, or alternatively, and as another example, an electronic issue ticket may include issue-related information from the computing device (e.g., automatically generated issue-related information).

In some implementations, the issue-related information and/or the electronic issue ticket may be in the form of an image. For example, a computing device and/or the IT ticketing system may capture a screen shot of an issue. In some implementations, the problem detection platform may process the image using an image processing technique, such as a computer vision technique, an optical character recognition (OCR) technique, and/or the like. In some implementations, the problem detection platform may extract information related to an issue from the image using the image processing technique.

As shown by reference number 104, the IT ticketing system may provide a copy of an electronic issue ticket that the IT ticketing system generated to the IT support center. For example, the IT ticketing system may provide the copy of the electronic issue ticket to the IT support center for resolution of an issue related to the electronic issue ticket.

As shown by reference number 106, the IT ticketing system may provide another copy of the electronic issue ticket to the problem detection platform for further analysis. For example, the IT ticketing system may provide thousands, millions, or more electronic issue tickets, in real-time or near real-time, for further analysis (e.g., for detection of a possible underlying problem among the computing devices based on the electronic issue tickets received from the IT ticketing system). In this way, the problem detection platform may receive a set of electronic issue tickets that cannot be analyzed by a human actor.

As shown by reference number 108, the problem detection platform may process text included in the electronic issue ticket (e.g., utilizing a text processing technique). For example, the problem detection platform may process the text using a natural language processing technique, a computational linguistics technique, a text analysis technique, and/or the like. In some implementations, the problem detection platform may utilize the text processing technique to identify a set of terms included in the electronic issue ticket, to identify a pattern of terms included in the electronic issue ticket, and/or the like, as described elsewhere herein. In some implementations, the problem detection platform may process text for thousands, millions, or more electronic issue tickets (e.g., in real-time or near real-time), thereby processing a set of electronic issue tickets that cannot be processed manually or objectively by a human actor. In addition, utilizing the text processing technique reduces a computational time for processing data described herein by an amount that would not be possible by a human actor.

In some implementations, the problem detection platform may process other content associated with the electronic issue ticket. For example, the problem detection platform may process a categorization of the electronic issue ticket (e.g., an issue category, an issue sub-category, and/or the like as described elsewhere herein), a priority of the electronic issue ticket (e.g., information that indicates whether the electronic ticket has a high priority, a medium priority, or a low priority), an identity of a computing resource (e.g., a computing device, an application, and/or the like) associated with the electronic issue ticket, such as a computing resource that generated the electronic issue ticket, and/or the like. In some implementations, the other content may be included in text included in the electronic issue ticket, metadata associated with the electronic issue ticket, and/or the like (e.g., which the problem detection platform may identify utilizing the natural language processing technique). Additionally, or alternatively, the problem detection platform may determine the other content based on text included in the electronic issue ticket, metadata associated with the electronic issue ticket, and/or the like (e.g., based on using a machine learning module to identify the other content based on a set of terms included in the text).

In some implementations, the problem detection platform may process electronic issue tickets by organization (e.g., utilizing a set of rules that is specific for an organization), across organizations (e.g., utilizing a set of rules that is applicable for multiple organizations, by updating a machine learning module that is to be used to perform an analysis on a first organization with results of an analysis of a second organization, and/or the like), and/or the like. In this way, the problem detection platform provides a tool that can intelligently analyze electronic issue tickets in a manner not previously known.

In some implementations, the problem detection platform may pre-process the text of the electronic issue ticket prior to identifying a set of terms included in the text and/or a pattern of terms included in the text. For example, the problem detection platform may remove formatting from the text (e.g., may convert the text into plain text), may correct spelling errors in the text, may convert a term into a root form (e.g., may convert the terms "accessed," and "accessing," into the term "access"), may expand acronyms (e.g., may expand the acronym "OS" into the terms "operating" and "system"), and/or the like. In this way, the pre-processing that the problem detection platform performs may facilitate easier, quicker, and/or more efficient processing of the text, thereby conserving computing resources of the problem detection platform that would otherwise be consumed processing inconsistently formatted text.

Figure 1B:
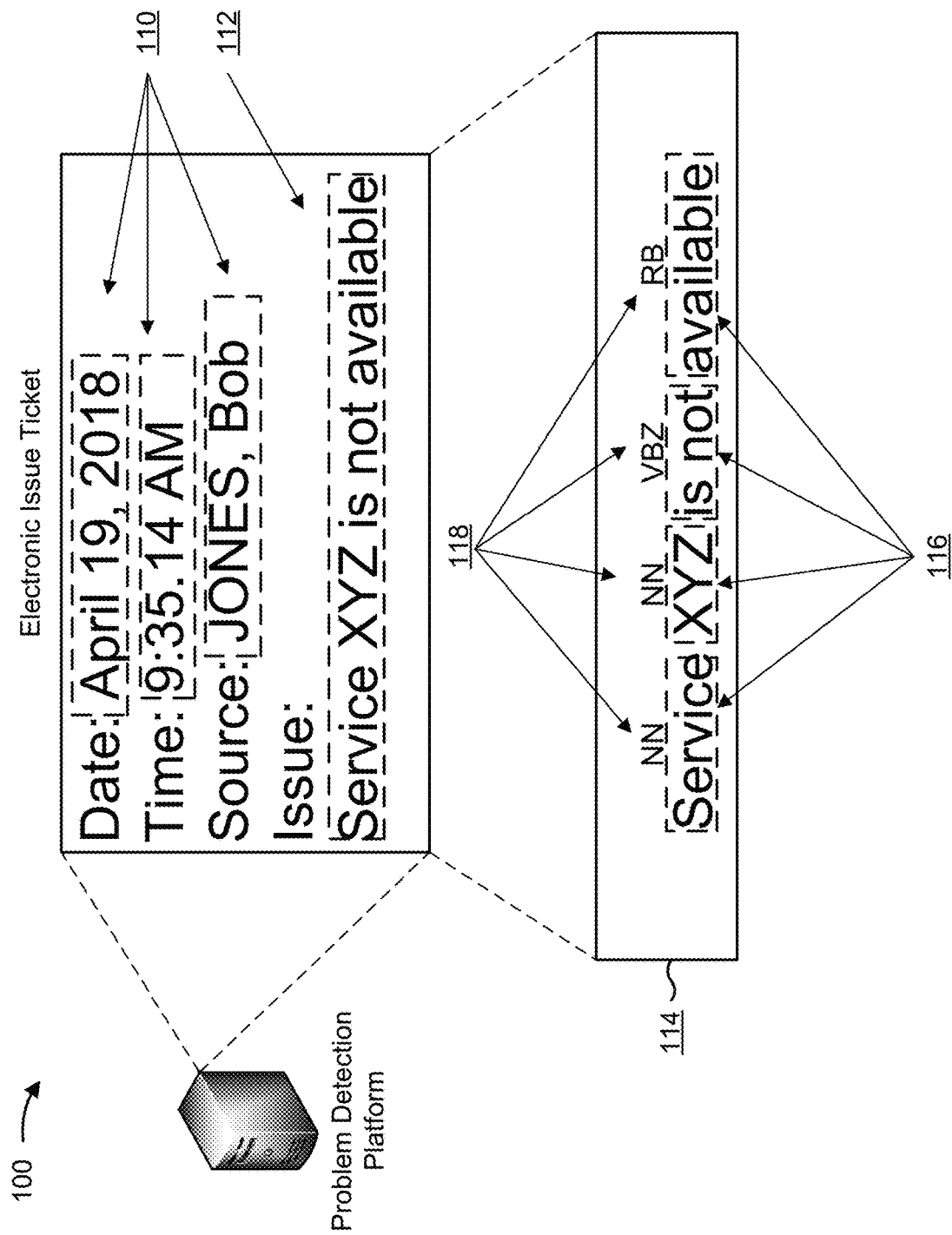

Turning to FIG. 1B, and as shown by reference number 110, the problem detection platform may identify metadata for the electronic issue ticket by processing text associated with the electronic issue ticket using the text processing technique. For example, the metadata may identify a date on which the electronic issue ticket was generated, a time at which the electronic issue ticket was generated, a source of the electronic issue ticket (e.g., a computing device that generated the electronic issue ticket, a user of the computing device, and/or the like), and/or the like. As shown by reference number 112, the problem detection platform may identify text related to the issue with which the electronic issue ticket is associated. For example, the text may include text input into a text box by a user of the computing device with which the electronic issue ticket is associated, text automatically generated by the computing device upon occurrence of the issue, and/or the like. Additionally, or alternatively, the problem detection platform may identify a menu item selection, a radio button selection, and/or the like included in the electronic issue ticket that indicates the issue with which the electronic issue ticket is associated.

Reference number 114 shows an expanded view of the text related to the issue with which the electronic issue ticket is associated for illustrative and/or explanatory purposes. In some implementations, the problem detection platform may further process the text related to the issue that is included in the electronic issue ticket. In some implementations, and as shown by reference number 116, the problem detection platform may identify a set of terms (e.g., a single term, a multi-term phrase, and/or the like) included in the text utilizing the natural language processing technique. For example, the problem detection platform may identify the terms "service," "XYZ," "is not," and "available" in the text. Additionally, or alternatively, and as shown by reference number 118, the problem detection platform may perform part-of-speech tagging of a set of terms included in the text. For example, the problem detection platform may tag terms included in the text with a respective part-of-speech tag that identifies a part-of-speech of a corresponding term. As a specific example, the problem detection platform may tag the terms "service" and "XYZ" with the tag "NN" to identify the terms "service" and "XYZ" as nouns, the multi-term phrase "is not" with the tag "VBZ" to identify the multi-term phrase "is not" as a verb, and the term "available" with the tag "RB" to identify the term "available" as an adverb. Other tags are possible and may differ from what is shown in FIG. 1B.

In some implementations, the problem detection platform may identify a pattern of terms included in the text based on the tags with which the problem detection platform tagged the set of terms included in the text. For example, the problem detection platform may identify "NN VBZ RB" as the pattern of terms included in the text. This may facilitate classification of the electronic issue ticket into a theme, an issue category, an issue sub-category, and/or the like, as described elsewhere herein. In addition, this may reduce or eliminate ambiguities arising from free text entered by humans, thereby improving processing of the text. Further, this may facilitate classification of issues seamlessly even in the case of completely new issues, for new organizations, and/or the like.

In some implementations, the problem detection platform may utilize a machine learning module to identify a set of terms included in text of the electronic issue ticket and/or a pattern of terms included in the text. For example, the machine learning module may have been trained on a training set of data that includes text from electronic issue tickets and information identifying relevant terms included in the text, a pattern of terms included in the text, and/or the like. In some implementations, the machine learning module may have been trained to identify a set of terms and/or a pattern of terms associated with an organization, an industry, and/or the like. In this way, the problem detection platform can be customized to identify a set of terms and/or a pattern of terms included in text of an electronic issue ticket.

Figure 1C:
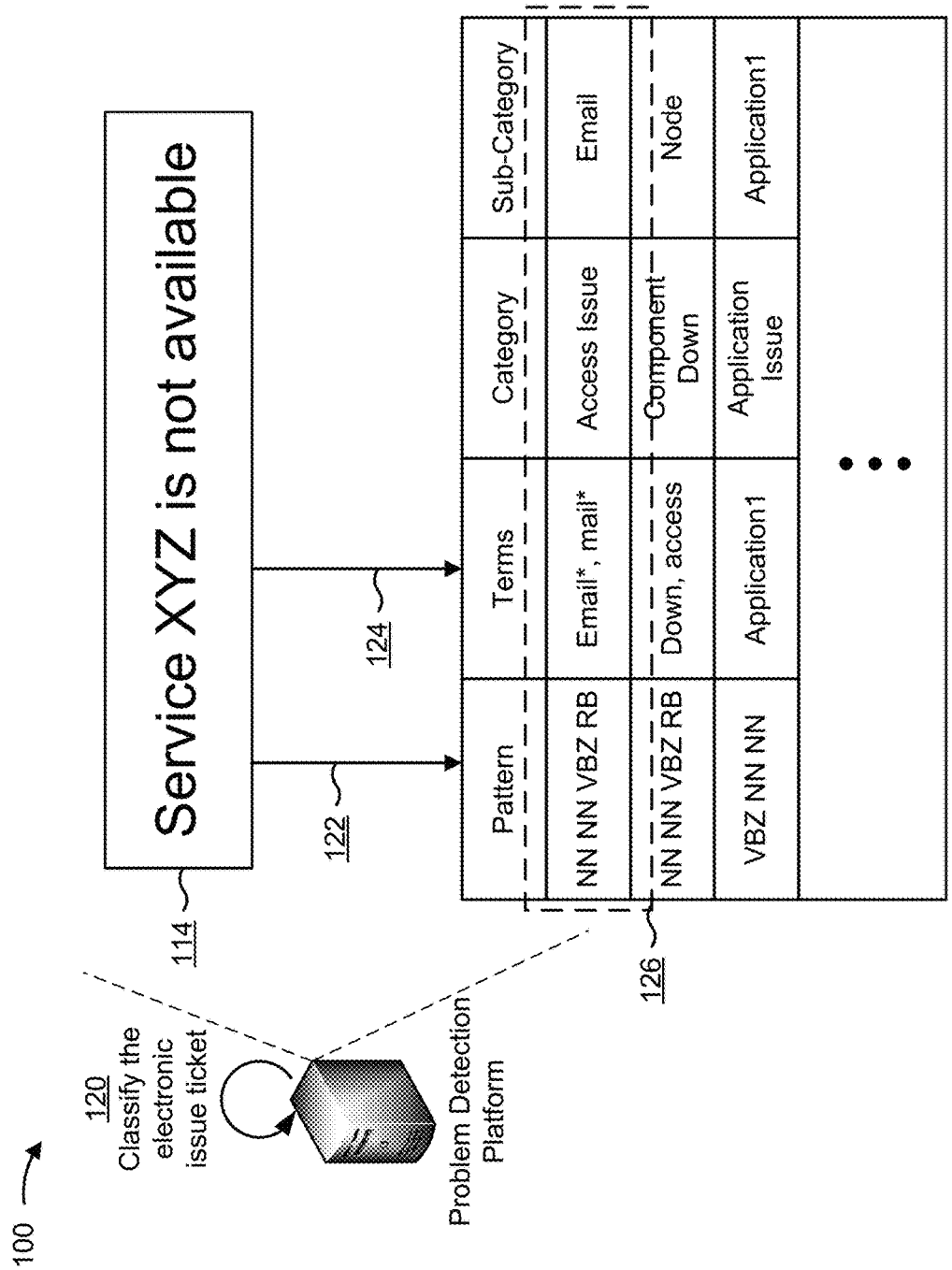

Turning to FIG. 1C, and as shown by reference number 120, the problem detection platform may classify the electronic issue ticket into a theme (not shown in FIG. 1C), an issue category, and/or an issue sub-category. For example, a theme, an issue category, and/or an issue sub-category may identify similar issues, issues that may have similar resolutions, issue tickets that could be resolved by the same team in an IT support center, similarly structured text for an issue, and/or the like. In some implementations, and as shown by reference number 122, the problem detection platform may classify the electronic issue ticket by performing a match of a pattern of terms included in the text (e.g., shown by reference number 114) and information, included in a data structure, that identifies a set of patterns included in a data structure. For example, the problem detection platform may classify the electronic issue ticket into a theme and/or an issue category based on the pattern of terms included in the text.

In some implementations, the problem detection platform may generate the issue categories and/or the issue sub-categories into which an electronic issue ticket could be classified. For example, the problem detection platform may process text of historical electronic issue tickets to generate the issue categories and/or the possible issue categories. Continuing with the previous example, the problem detection platform may process text of historical electronic issue tickets into individual terms to generate a corpus of terms for the historical electronic issue tickets. Additionally, or alternatively, and as shown by reference number 124, the problem detection platform may classify the electronic issue ticket by performing a match of a set of terms included in the text (e.g., shown by reference number 114) and information, included in a data structure, that identifies a set of terms. For example, the problem detection platform may classify the electronic issue ticket into an issue sub-category based on the set of terms included in the text (e.g., by matching the set of terms included in the text with another set of terms identified by information included in the data structure). In some implementations, the problem detection platform may perform a match of the set of terms to include the electronic issue ticket in a particular issue category or issue sub-category or to exclude the electronic issue ticket from a particular issue category or issue sub-category. As shown by reference number 126, the problem detection platform may classify the electronic issue ticket into the "access issue" issue category and the "email" issue sub-category based on the pattern of terms included in the text of the electronic issue ticket and/or the set of terms included in the issue sub-category.

In some implementations, a machine learning module associated with the problem detection platform may have been trained to classify the electronic issue ticket. For example, the machine learning module may have been trained on a training set of data that identifies a set of terms and/or a pattern of terms included in text and information that identifies an issue category and/or an issue sub-category for the text. In this case, the problem detection platform may utilize the machine learning module to process the text of the electronic issue ticket to identify an issue category and/or an issue sub-category for the electronic issue ticket.

In some implementations, stop words, such as conjunctions, articles, and/or the like may be removed from the corpus of terms by utilizing a text processing technique. In some implementations, the problem detection platform may calculate a frequency of an occurrence of a set of terms and/or a pattern of terms across the historical electronic issue tickets (e.g., within an electronic issue ticket, across multiple electronic issue tickets, and/or the like). In some implementations, the problem detection platform may then identify a set of terms and/or a pattern of terms that occur together at a threshold frequency to identify issue categories, issue sub-categories, a respective set of terms for an issue category and/or an issue sub-category, a respective pattern of terms for an issue category and/or an issue sub-category, and/or the like.

In some implementations, the problem detection platform may provide information identifying issue categories and/or issue sub-categories for display via a client device and may update the identified issue categories and/or issue sub-categories based on input from a user of the client device (e.g., input that modifies an identified issue category and/or an issue sub-category). In some implementations, the problem detection platform may refine terms identified in the text (e.g., associated with various issue categories and/or various issue sub-categories). For example, the problem detection platform may generate root terms for terms identified in the text, may use a particular term for synonymous terms, and/or the like. In some implementations, the problem detection platform may perform similar processing of a new electronic issue ticket to facilitate identification of an issue-category and/or an issue sub-category for the new electronic issue ticket (e.g., may remove stop words from text of the new electronic issue ticket, may replace various synonyms included in the text with a single term, and/or the like). This facilitates quick and efficient classification of an electronic issue ticket, thereby reducing an amount of time needed to classify an electronic issue ticket, conserving processing resources of the problem detection platform that would otherwise be consumed via a longer classification process, and/or the like.

In some implementations, the problem detection platform may iterate a counter after classifying the electronic issue ticket. For example, the problem detection platform may iterate the counter by a quantity of electronic issue tickets classified into an issue category and/or an issue sub-category. In some implementations, a counter may be associated with an issue category and/or an issue sub-category. For example, a value of the counter may indicate a quantity of electronic issue tickets classified into an issue category and/or an issue sub-category. In some implementations, a counter may be associated with a threshold value (e.g., a value to be used to determine whether a possible underlying problem exists). In some implementations, a threshold value may include a pre-defined value (e.g., a pre-defined standard value) for different issue categories, issue sub-categories, and/or the like, which may provide an indication of when the problem detection platform needs to generate an issue ticket.

Figure 1D:
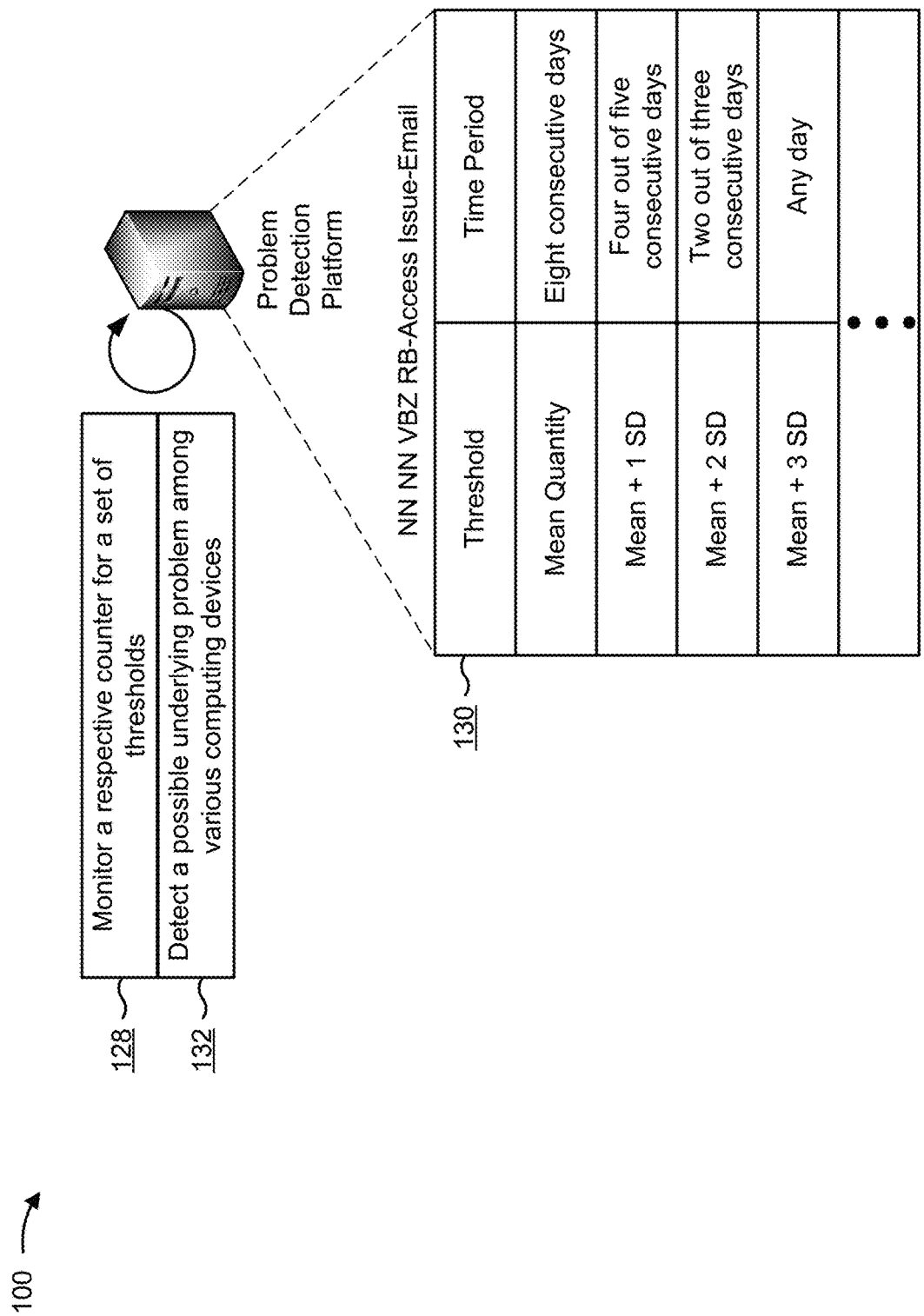

Turning to FIG. 1D, and as shown by reference number 128, the problem detection platform may monitor a respective counter for a set of thresholds. For example, the problem detection platform may monitor the respective counter to determine whether a value of the respective counter satisfies the set of thresholds. As shown by reference number 130, the set of thresholds may be associated with a mean quantity of electronic issue tickets received for an issue category and/or an issue sub-category and various standard deviations of the mean quantity (e.g., as determined from historical data that identifies a historical quantity of electronic issue tickets received for an issue category and/or an issue sub-category). As further shown by reference number 130, a threshold may be associated with a respective time period. For example, for a threshold to be satisfied, the threshold may need to be satisfied during the respective time period. Continuing with the previous example, if the problem detection platform classifies a quantity of electronic issue tickets, which satisfies a mean quantity of electronic issue tickets for an issue category and/or an issue sub-category, into the issue category and/or the issue sub-category for each of eight consecutive days or during any eight consecutive day period, the problem detection platform may determine that a threshold for the issue category and/or the issue sub-category has been satisfied and may accordingly detect a possible underlying problem (as described elsewhere herein). In some implementations, the problem detection platform may reset a value for a respective counter when a time period associated with a threshold has elapsed (e.g., every eight consecutive days, every day, and/or the like).

In some implementations, the problem detection platform may determine the set of thresholds to be used to detect a possible underlying problem. For example, the problem detection platform may process historical information to identify historical quantities of electronic issue tickets received for various issue categories and/or issue sub-categories. Continuing with the previous example, the problem detection platform may determine a mean, or an average, quantity of electronic issue tickets received for various issue categories and/or various issue sub-categories, various standard deviations for the quantity of electronic issue tickets received, and/or the like. In some implementations, the problem detection platform may utilize Western Electric rules to determine the set of thresholds. For example, the problem detection platform may utilize the Western Electric rules to detect out-of-control and/or non-random conditions in the historical information and may set thresholds based on the out-of-control and/or non-random conditions.

As shown by reference number 132, the problem detection platform may detect a possible underlying problem among various computing devices (e.g., a problem that could be causing one or more issues with operations of various computing devices). For example, the problem detection platform may detect a possible underlying problem by detecting that one of the set of thresholds has been satisfied (e.g., during the time period). Additionally, or alternatively, the problem detection platform may detect a possible underlying problem based on a pattern of values for the respective counter across the different thresholds. For example, the problem detection platform may utilize a machine learning module to process information that identifies the values for the respective counter for the set of thresholds to determine whether the pattern of the values indicates a possible underlying problem. Continuing with the previous example, the problem detection platform may have been trained on a training set of data that identifies a pattern of values for various counters and information that indicates whether the pattern of values indicates a possible underlying problem. In this way, the problem detection platform can quickly and efficiently identify a possible underlying problem among various computing devices, when various thresholds are not being satisfied, and/or the like.

Figure 1E:
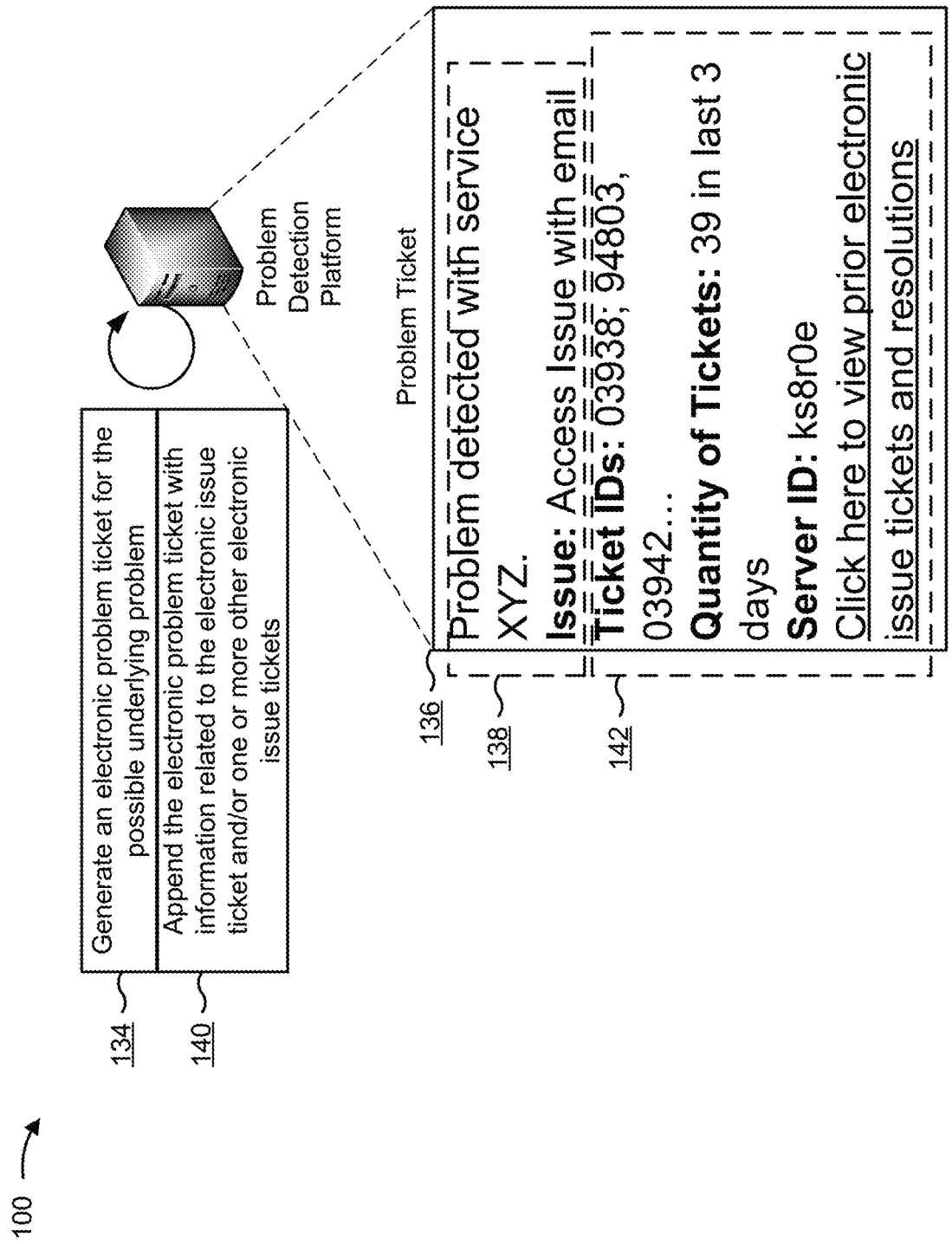

Turning to FIG. 1E, and as shown by reference number 134, the problem detection platform may generate an electronic problem ticket for the possible underlying problem. For example, the problem detection platform may generate the electronic problem ticket automatically after detecting the possible underlying problem, based on receiving input to generate the electronic problem ticket, and/or the like. Reference number 136 shows an example electronic problem ticket that the problem detection platform may generate. For example, and as shown by reference number 138, the electronic problem ticket may include information that identifies that a possible underlying problem with a computing device, a service, an application, and/or the like has been detected, the particular possible underlying problem detected (e.g., an issue category and/or an issue sub-category), and/or the like.

As shown by reference number 140, the problem detection platform may append the electronic problem ticket with information related to the electronic issue ticket and/or one or more other electronic issue tickets. For example, and as shown by reference number 142, the problem detection platform may append the electronic problem ticket with information that identifies electronic issue tickets associated with the same issue category and/or the same issue sub-category, a quantity of electronic issue tickets received for an issue category and/or an issue sub-category during a time period, a computing device with which the electronic issue tickets are associated, a link to the electronic issue tickets associated with the problem ticket (e.g., a link to a storage location in memory resources of the problem detection platform), a link to a respective resolution ticket for the electronic issue tickets associated with the problem ticket (e.g., a link to a storage location in memory resources for the respective resolution tickets), and/or the like.

Figure 1F:
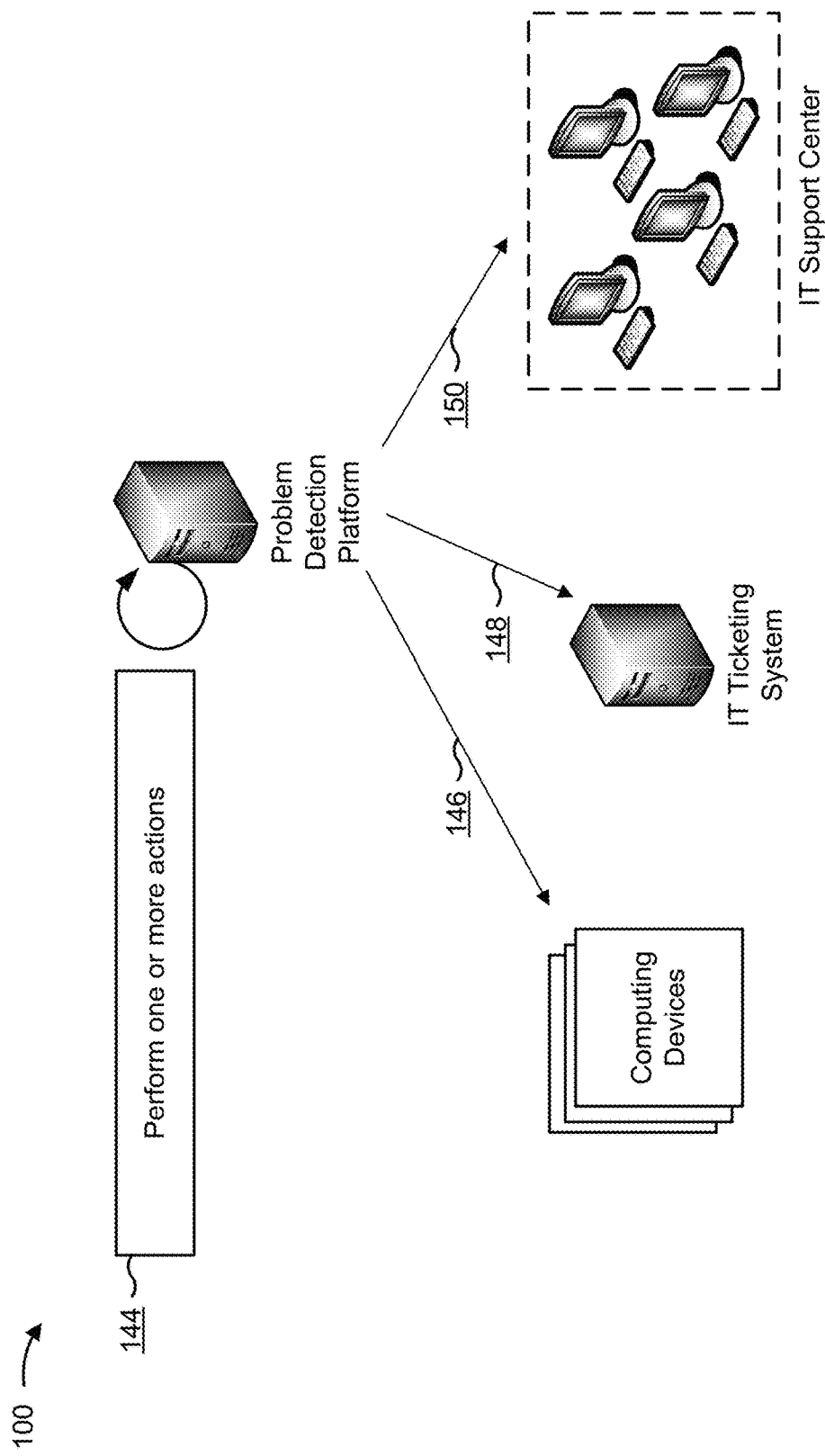

Turning to FIG. 1F, and as shown by reference number 144, the problem detection platform may perform one or more actions in association with generating the electronic problem ticket. For example, and as shown by reference number 146, the problem detection platform may modify operations of a computing device. For example, the problem detection platform may download software for the computing device and may install the software on the computing device. Additionally, or alternatively, and as other examples, the problem detection platform may power down a particular computing device, may power on a particular computing device, may uninstall software from a particular computing device (or downgrade a version of software installed on the computing device), may perform a security operation (e.g., a scan for malware, a removal of malware, and/or the like) on a particular computing device, and/or the like. In this way, the problem detection platform may utilize robotic process automation to perform an action to facilitate fixing an issue.

In some implementations, the problem detection platform may access a knowledge base of prior resolutions of issues to facilitate fixing of an issue. For example, the problem detection platform may access an execution script previously loaded into the problem detection platform for an issue and may execute the execution script to resolve the issue. Additionally, or alternatively, the problem detection platform may generate a set of instructions for resolving a possible underlying problem and may output the set of instructions for display via a client device to facilitate fixing of the possible underlying problem. For example, the problem detection platform may data mine prior resolution tickets for information related to a possible solution for a possible underlying problem and may generate a set of recommendations for fixing the possible underlying problem based on a result of data mining the prior resolution tickets. Additionally, or alternatively, the problem detection platform may store a data structure that includes information related to prior resolutions of issues and may provide users of client devices with access to the data structure to facilitate self-help resolution of an issue.

As shown by reference number 148, the problem detection platform may modify operations of the IT ticketing system. For example, the problem detection platform may provide a set of instructions to the IT ticketing system to cause the IT ticketing system to flag electronic issue tickets related to the same issue category and/or the same issue sub-category as the electronic issue ticket (e.g., to prevent further resolution of the related issues while the possible underlying problem is being resolved). Additionally, or alternatively, and as other examples, the problem detection platform may provide a set of instructions to the IT ticketing system to cause the IT ticketing system to provide an electronic issue ticket directly to a team associated with the IT support center handling the electronic problem ticket (e.g., after identifying an appropriate team to which to provide the electronic issue ticket and/or the electronic problem ticket based on the set of terms included in the text of the electronic issue ticket and/or the electronic problem ticket), to trigger an alarm when an electronic issue ticket associated with a particular issue category and/or a particular issue sub-category occurs, to generate and/or output a report related to a particular electronic issue ticket, and/or the like.

Additionally, or alternatively, the problem detection platform may provide a set of instructions to the IT ticketing system to cause the IT ticketing system to start recording resolution steps performed by a technician associated with the IT support center when resolving individual issues associated with an electronic problem ticket. In some implementations, the problem detection platform may store these recordings in a data structure to facilitate faster resolution of other issues related to a possible underlying problem while the possible underlying problem is being resolved, thereby conserving resources associated with resolving repetitive issues related to the same possible underlying problem. For example, the problem detection platform may store a video of the resolutions, may store a macro that can be executed to resolve an issue, and/or the like. In some implementations, the problem detection platform may communicate with a computing device directly to resolve an issue based on the steps that were recorded, by communicating with an IT ticketing system to resolve an issue based on the steps that were recorded, and/or the like). This conserves resources that would otherwise be consumed via repeated manual resolution of an issue.

Additionally, or alternatively, the problem detection platform may data mine information identifying the steps used to resolve issues related to a possible underlying problem to determine whether various technicians are performing the same steps to resolve the issues, are performing different steps to resolve the issues, and/or the like. In this way, the problem detection platform can identify a possible resolution for a possible underlying problem based on the same issue that is recurring for a possible underlying problem, for different issues that are occurring for a possible underlying problem, and/or the like. In some implementations, the problem detection platform may utilize the recorded resolutions to resolve issues while a possible underlying problem is being resolved.

As shown by reference umber 150, the problem detection platform may provide the electronic problem ticket to the IT support center. For example, the problem detection platform may provide the electronic problem ticket to a particular team within the IT support center (e.g., by identifying the particular team as being associated with the issue category and/or the issue sub-category associated with the problem ticket and providing the problem ticket for display via a client device associated with the particular team). Additionally, or alternatively, the problem detection platform may generate a report (e.g., related to additional electronic issue tickets received by the IT ticketing system that are associated with the same issue category and/or issue sub-category as the electronic problem ticket) and may provide the report for display.

In this way, the problem detection platform may process electronic issue tickets to identify a possible underlying problem related to various computing devices. This facilitates analysis of issues related to the computing devices in a manner that is not possible by a human actor, thereby improving analysis of thousands, millions, or more electronic issue tickets. In addition, this provides a tool for detecting possible underlying problems associated with various computing devices in a manner not previously possible. Further, this conserves processing resources that would otherwise be consumed due to repeated issues, issues related to the same possible underlying problem, and/or the like.

As indicated above, FIGS. 1A-1F are provided merely as examples. Other examples are possible and may differ from what was described with regard to FIGS. 1A-1F.

Figure 2:
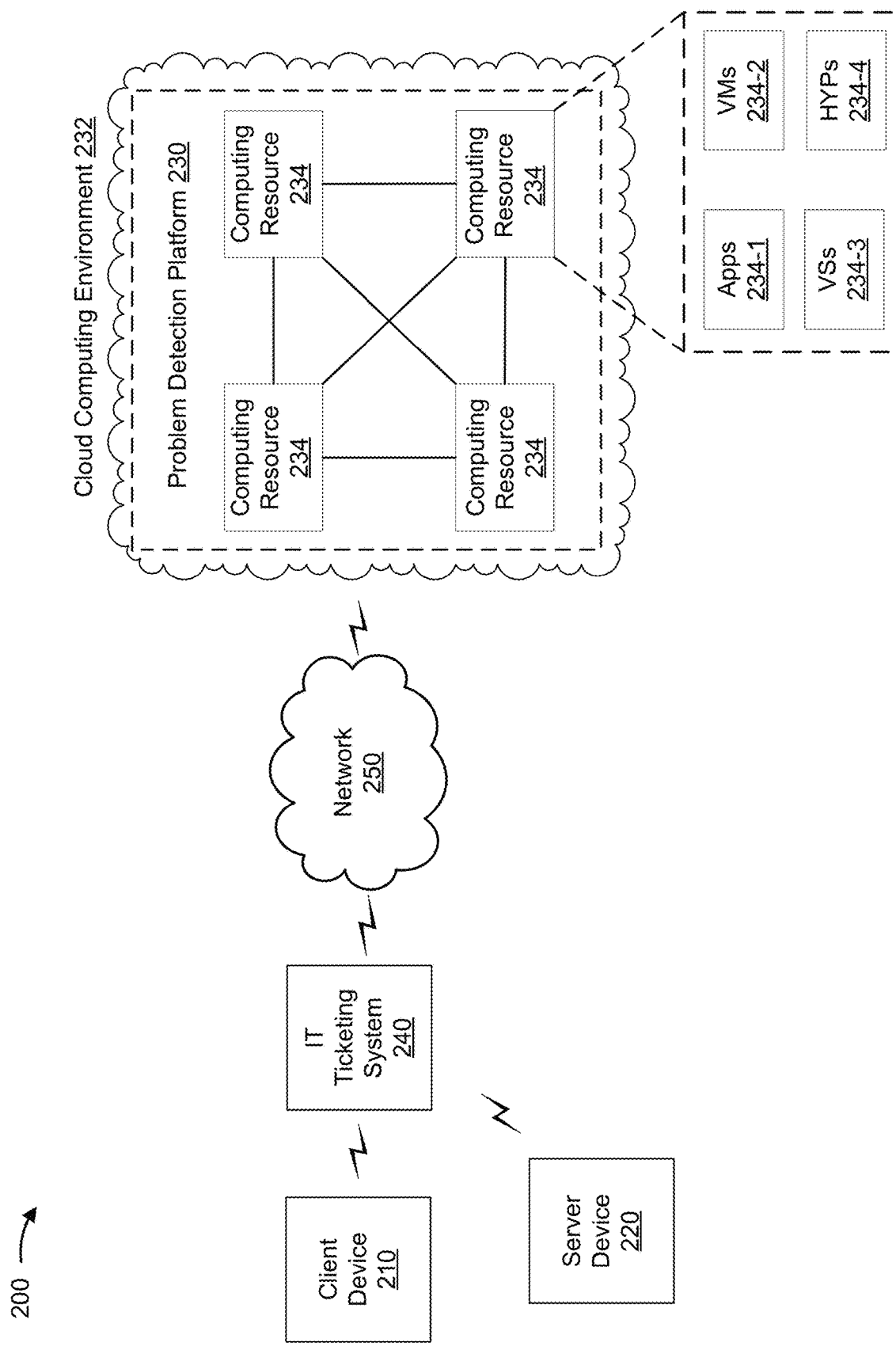
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a problem detection platform 230 in a cloud computing environment 232 that includes a set of computing resources 234, an IT ticketing system 240, and a network 250. Devices of environment 200 may interconnect via wired connections, wireless connections, or a combination of wired and wireless connections.

Client device 210 includes one or more devices capable of receiving, generating, storing, processing, and/or providing information associated with electronic issue tickets. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may provide, to problem detection platform 230 and/or IT ticketing system 240, issue-related information for an issue associated with client device 210, as described elsewhere herein.

Server device 220 includes one or more devices capable of receiving, generating storing, processing, and/or providing information associated with electronic issue tickets. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may provide, to problem detection platform 230 and/or IT ticketing system 240, issue-related information for an issue associated with server device 220, as described elsewhere herein.

Problem detection platform 230 includes one or more devices capable of receiving, generating, storing, processing, and/or providing information related to electronic issue tickets. For example, problem detection platform 230 may include a cloud server or a group of cloud servers. In some implementations, problem detection platform 230 may be designed to be modular such that certain software components can be swapped in or out depending on a particular need. As such, problem detection platform 230 may be easily and/or quickly reconfigured for different uses.

In some implementations, as shown in FIG. 2, problem detection platform 230 may be hosted in cloud computing environment 232. Notably, while implementations described herein describe problem detection platform 230 as being hosted in cloud computing environment 232, in some implementations, problem detection platform 230 may not be cloud-based (i.e., may be implemented outside of a cloud computing environment) or may be partially cloud-based.

Cloud computing environment 232 includes an environment that hosts problem detection platform 230. Cloud computing environment 232 may provide computation, software, data access, storage, and/or other services that do not require end-user knowledge of a physical location and configuration of a system and/or a device that hosts problem detection platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host problem detection platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with problem detection platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

IT ticketing system 240 includes one or more devices capable of receiving, generating storing, processing, and/or providing information associated with electronic issue tickets. For example, IT ticketing system 240 may include an IT ticketing system, a technical support system, and/or a similar type of system. In some implementations, IT ticketing system 240 may receive issue-related information from client device 210 and/or server device 220 and may generate an electronic issue ticket for the issue-related information, as described elsewhere herein. Additionally, or alternatively, IT ticketing system 240 may provide the electronic issue ticket to problem detection platform 230, as described elsewhere herein.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
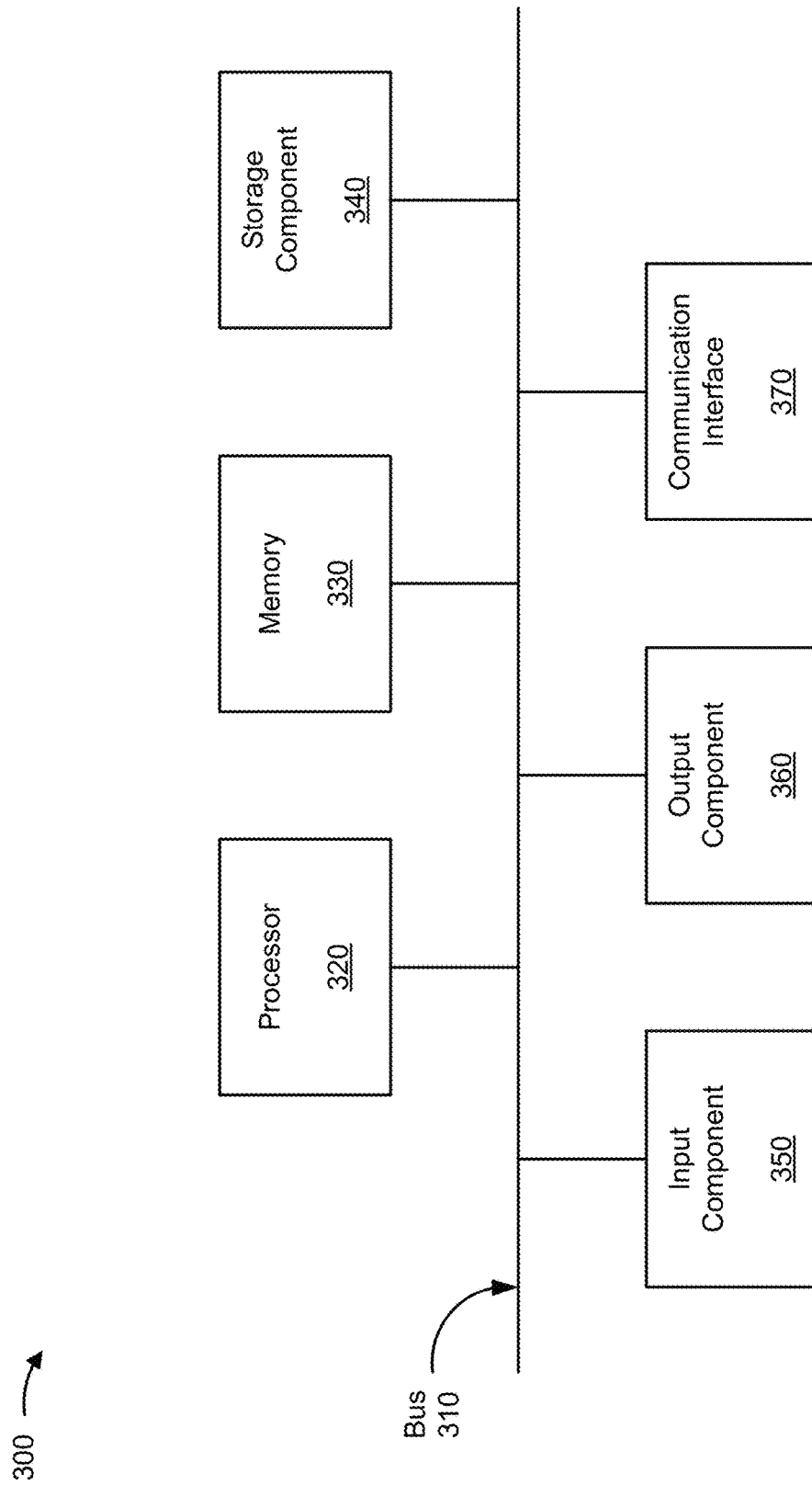
FIG. 3 is a diagram of example components of one or more devices of FIG. 2.

FIG. 3 is a diagram of example components of a device 300. Device 300 may correspond to client device 210, server device 220, problem detection platform 230, computing resource 234, and/or IT ticketing system 240. In some implementations, client device 210, server device 220, problem detection platform 230, computing resource 234, and/or IT ticketing system 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
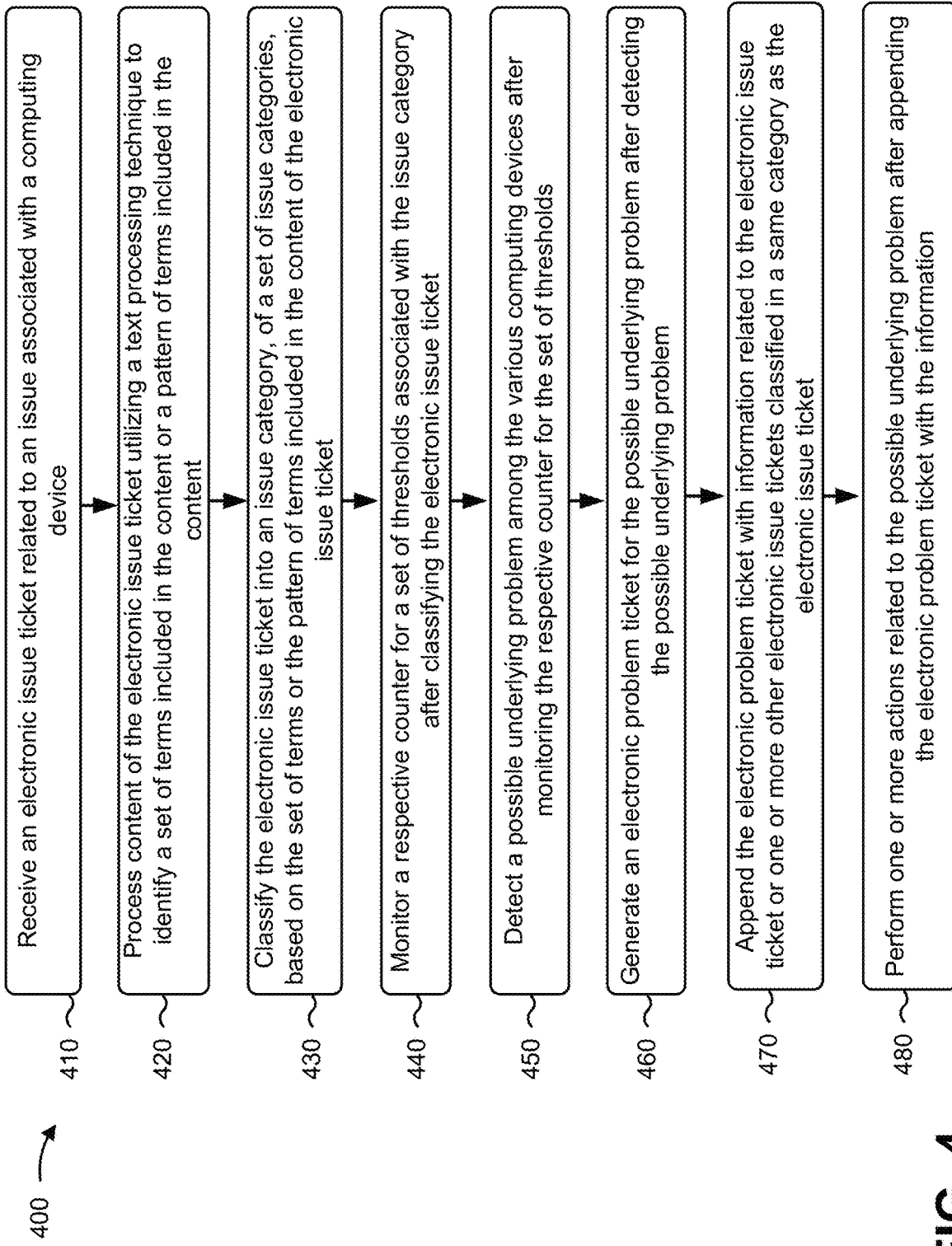
FIG. 4 is a flow chart of an example process for detecting a possible underlying problem among computing devices.

FIG. 4 is a flow chart of an example process 400 for detecting a possible underlying problem among computing devices. In some implementations, one or more process blocks of FIG. 4 may be performed by a problem detection platform (e.g., problem detection platform 230). In some implementations, one or more process blocks of FIG. 4 may be performed by another device or a group of devices separate from or including the problem detection platform, such as a client device (e.g., client device 210), a server device (e.g., server device 220), or an IT ticketing system (e.g., IT ticketing system 240).

As shown in FIG. 4, process 400 may include receiving an electronic issue ticket related to an issue associated with a computing device (block 410). For example, the problem detection platform (e.g., using computing resource 234, processor 320, input component 350, communication interface 370, and/or the like) may receive an electronic issue ticket related to an issue associated with a computing device in a manner that is the same as or similar to that described with respect to FIGS. 1A-1F.

As further shown in FIG. 4, process 400 may include processing content of the electronic issue ticket utilizing a text processing technique to identify a set of terms included in the content or a pattern of terms included in the content (block 420). For example, the problem detection platform (e.g., using computing resource 234, processor 320, and/or the like) may process content of the electronic issue ticket utilizing a text processing technique to identify a set of terms included in the content or a pattern of terms included in the content in a manner that is the same as or similar to that described with respect to FIGS. 1A-1F. In some implementations, the content may include text included in the electronic issue ticket, a categorization of the electronic issue ticket, a priority of the electronic issue ticket, or an identity of the computing device associated with the electronic issue ticket.

As further shown in FIG. 4, process 400 may include classifying the electronic issue ticket into an issue category, of a set of issue categories, based on the set of terms or the pattern of terms included in the content of the electronic issue ticket (block 430). For example, the problem detection platform (e.g., using computing resource 234, processor 320, and/or the like) may classify the electronic issue ticket into an issue category, of a set of issue categories, based on the set of terms or the pattern of terms included in the content of the electronic issue ticket in a manner that is the same as or similar to that described with respect to FIGS. 1A-1F.

As further shown in FIG. 4, process 400 may include monitoring a respective counter for a set of thresholds associated with the issue category after classifying the electronic issue ticket (block 440). For example, the problem detection platform (e.g., using computing resource 234, processor 320, and/or the like) may monitor a respective counter for a set of thresholds associated with the issue category after classifying the electronic issue ticket in a manner that is the same as or similar to that described with respect to FIGS. 1A-1F.

As further shown in FIG. 4, process 400 may include detecting a possible underlying problem among the various computing devices after monitoring the respective counter for the set of thresholds (block 450). For example, the problem detection platform (e.g., using computing resource 234, processor 320, and/or the like) may detect a possible underlying problem among the various computing devices after monitoring the respective counter for the set of thresholds in a manner that is the same as or similar to that described with respect to FIGS. 1A-1F.

As further shown in FIG. 4, process 400 may include generating an electronic problem ticket for the possible underlying problem after detecting the possible underlying problem (block 460). For example, the problem detection platform (e.g., using computing resource 234, processor 320, and/or the like) may generate an electronic problem ticket for the possible underlying problem after detecting the possible underlying problem in a manner that is the same as or similar to that described with respect to FIGS. 1A-1F.

As further shown in FIG. 4, process 400 may include appending the electronic problem ticket with information related to the electronic issue ticket or one or more other electronic issue tickets classified in a same category as the electronic issue ticket (block 470). For example, the problem detection platform (e.g., using computing resource 234, processor 320, and/or the like) may append the electronic problem ticket with information related to the electronic issue ticket or one or more other electronic issue tickets classified in a same category as the electronic issue ticket in a manner that is the same as or similar to that described with respect to FIGS. 1A-1F.

As further shown in FIG. 4, process 400 may include performing one or more actions related to the possible underlying problem after appending the electronic problem ticket with the information (block 480). For example, the problem detection platform (e.g., using computing resource 234, processor 320, output component 360, communication interface 370, and/or the like) may perform one or more actions related to the possible underlying problem after appending the electronic problem ticket with the information in a manner that is the same as or similar to that described with regard to FIGS. 1A-1F.

Process 400 may include additional implementations, such as any single implementation or any combination of implementations described below and/or in connection with one or more other methods described elsewhere herein.

In some implementations, the set of issue categories may be related to various issues associated with various computing devices. In some implementations, the set of thresholds may include a first threshold based on a historical average quantity of electronic issue tickets received for the issue category, a second threshold based on the historical average quantity of electronic issue tickets and one standard deviation of the historical average quantity of electronic issue tickets for the issue category, a third threshold based on the historical average quantity of electronic issue tickets and two standard deviations of the historical average quantity of electronic issue tickets for the issue category, or a fourth threshold based on the historical average quantity of electronic issue tickets and three standard deviations of the historical average quantity of electronic issue tickets for the issue category.

In some implementations, the information related to the electronic issue ticket or the one or more other electronic issue tickets may identify at least one of a respective identifier for the electronic issue ticket or the one or more other electronic issue tickets, another respective identifier for a respective computing device related to the electronic issue ticket or the one or more other electronic issue tickets, a respective timestamp for the electronic issue ticket or the one or more other electronic issue tickets, a quantity of electronic issue tickets received within a time period, a link to the electronic issue ticket or the one or more other electronic issue tickets, or another link to a respective resolution ticket for the electronic issue ticket or the one or more other electronic issue tickets.

In some implementations, the problem detection platform may receive the electronic issue ticket from an information technology (IT) ticketing system. In some implementations, the problem detection platform may perform a match of the pattern of terms included in the content to a set of patterns of terms after processing the content, and may classify the electronic issue ticket into the issue category based on the match. In some implementations, the problem detection platform may perform another match of the set of terms included in the content and another set of terms after processing the content, and may classify the electronic issue ticket into an issue sub-category based on the other match. In some implementations, the problem detection platform may download software for the computing device based on the possible underlying problem, and may install the software on the computing device after downloading the software.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
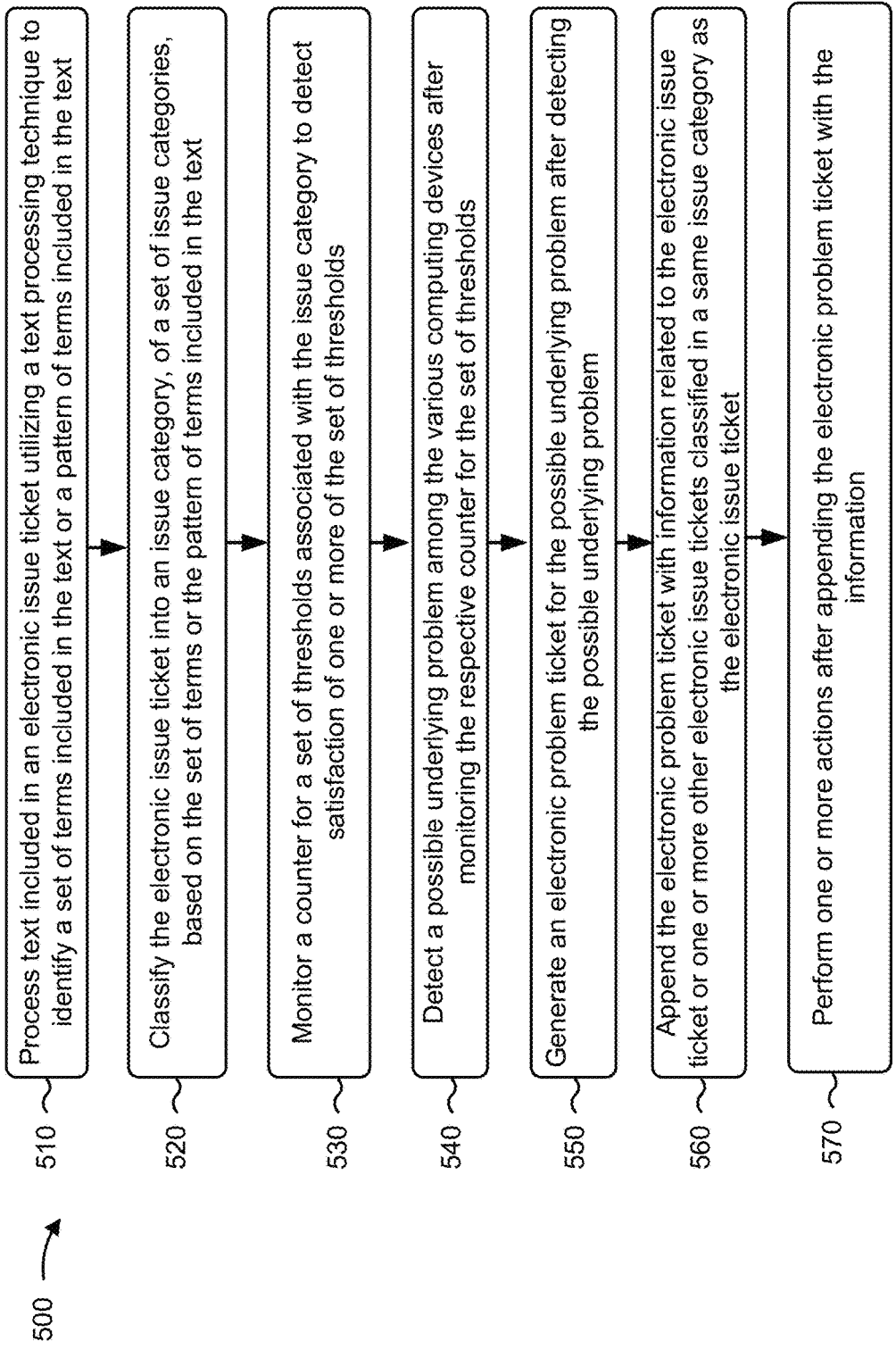
FIG. 5 is a flow chart of an example process for detecting a possible underlying problem among computing devices.

FIG. 5 is a flow chart of an example process 500 for detecting a possible underlying problem among computing devices. In some implementations, one or more process blocks of FIG. 5 may be performed by a problem detection platform (e.g., problem detection platform 230). In some implementations, one or more process blocks of FIG. 5 may be performed by another device or a group of devices separate from or including the problem detection platform, such as a client device (e.g., client device 210), a server device (e.g., server device 220), or an IT ticketing system (e.g., IT ticketing system 240).

As shown in FIG. 5, process 500 may include processing text included in an electronic issue ticket utilizing a text processing technique to identify a set of terms included in the text or a pattern of terms included in the text (block 510). For example, the problem detection platform (e.g., using computing resource 234, processor 320, and/or the like) may process text included in an electronic issue ticket utilizing a text processing technique to identify a set of terms included in the text or a pattern of terms included in the text in a manner that is the same as or similar to that described with regard to FIGS. 1A-1F.

As further shown in FIG. 5, process 500 may include classifying the electronic issue ticket into an issue category, of a set of issue categories, based on the set of terms or the pattern of terms included in the text (block 520). For example, the problem detection platform (e.g., using computing resource 234, processor 320, and/or the like) may classify the electronic issue ticket into an issue category, of a set of issue categories, based on the set of terms or the pattern of terms included in the text in a manner that is the same as or similar to that described with regard to FIGS. 1A-1F.

As further shown in FIG. 5, process 500 may include monitoring a counter for a set of thresholds associated with the issue category to detect satisfaction of one or more of the set of thresholds (block 530). For example, the problem detection platform (e.g., using computing resource 234, processor 320, and/or the like) may monitor a counter for a set of thresholds associated with the issue category to detect satisfaction of one or more of the set of thresholds in a manner that is the same as or similar to that described with regard to FIGS. 1A-1F.

As further shown in FIG. 5, process 500 may include detecting a possible underlying problem among the various computing devices after monitoring the respective counter for the set of thresholds (block 540). For example, the problem detection platform (e.g., using computing resource 234, processor 320, and/or the like) may detect a possible underlying problem among the various computing devices after monitoring the respective counter for the set of thresholds in a manner that is the same as or similar to that described with regard to FIGS. 1A-1F.

As further shown in FIG. 5, process 500 may include generating an electronic problem ticket for the possible underlying problem after detecting the possible underlying problem (block 550). For example, the problem detection platform (e.g., using computing resource 234, processor 320, and/or the like) may generate an electronic problem ticket for the possible underlying problem after detecting the possible underlying problem in a manner that is the same as or similar to that described with regard to FIGS. 1A-1F.

As further shown in FIG. 5, process 500 may include appending the electronic problem ticket with information related to the electronic issue ticket or one or more other electronic issue tickets classified in a same issue category as the electronic issue ticket (block 560). For example, the problem detection platform (e.g., using computing resource 234, processor 320, and/or the like) may append the electronic problem ticket with information related to the electronic issue ticket or one or more other electronic issue tickets classified in a same issue category as the electronic issue ticket in a manner that is the same as or similar to that described with regard to FIGS. 1A-1F.

As further shown in FIG. 5, process 500 may include performing one or more actions after appending the electronic problem ticket with the information (block 570). For example, the problem detection platform (e.g., using computing resource 234, processor 320, and/or the like) may perform one or more actions after appending the electronic problem ticket with the information in a manner that is the same as or similar to that described with regard to FIGS. 1A-1F.

Process 500 may include additional implementations, such as any single implementations or any combination of implementations described below and/or in connection with one or more other processes described elsewhere herein.

In some implementations, the electronic issue ticket may be related to an issue associated with a computing device. In some implementations, the set of issue categories may be related to various issues associated with various computing devices. In some implementations, different thresholds included in the set of thresholds may be associated with different time periods.

In some implementations, the problem detection platform may classify the electronic issue ticket into the issue category based on the pattern of terms included in the text and into an issue sub-category based on the set of terms included in the text. In some implementations, the problem detection platform may receive the electronic issue ticket from an information technology (IT) ticketing system prior to processing the text included in the electronic issue ticket. In some implementations, the problem detection platform may increment the counter after classifying the electronic issue ticket, and may determine whether the counter satisfies one of the different thresholds during one of the different time periods. In some implementations, the problem detection platform may power on another computing device based on the possible underlying problem, or may power down the computing device based on the possible underlying problem. In some implementations, the problem detection platform may identify a particular team within an information technology (IT) support center after appending the electronic problem ticket, and may transmit the problem ticket to a client device associated with the particular team after identifying the particular team.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
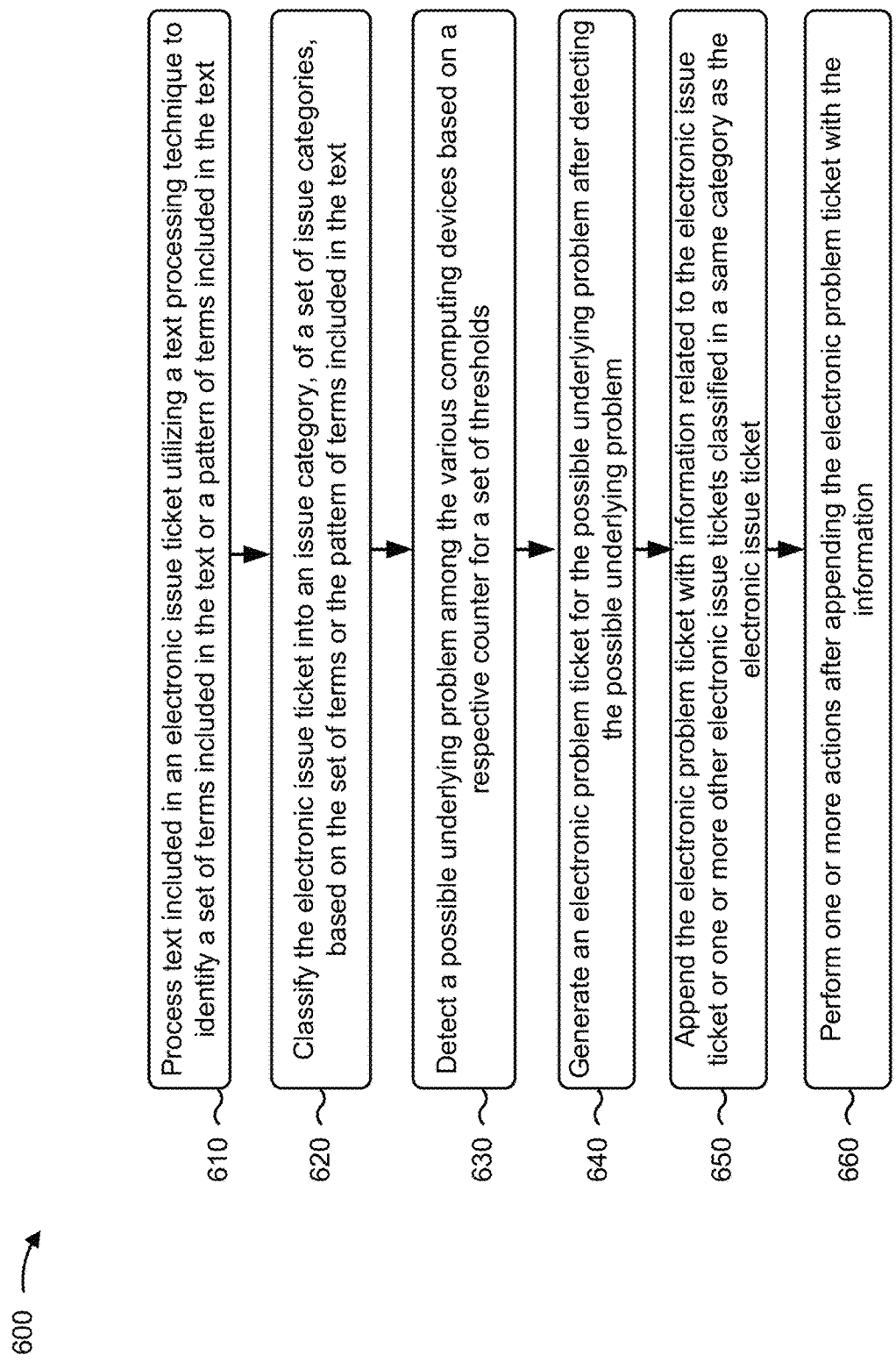
FIG. 6 is a flow chart of an example process for detecting a possible underlying problem among computing devices.

FIG. 6 is a flow chart of an example process 600 for detecting a possible underlying problem among computing devices. In some implementations, one or more process blocks of FIG. 6 may be performed by a problem detection platform (e.g., problem detection platform 230). In some implementations, one or more process blocks of FIG. 6 may be performed by another device or a group of devices separate from or including the problem detection platform, such as a client device (e.g., client device 210), a server device (e.g., server device 220), or an IT ticketing system (e.g., IT ticketing system 240).

As shown in FIG. 6, process 600 may include processing text included in an electronic issue ticket utilizing a text processing technique to identify a set of terms included in the text or a pattern of terms included in the text (block 610). For example, the problem detection platform (e.g., using computing resource 234, processor 320, and/or the like) may process text included in an electronic issue ticket utilizing a text processing technique to identify a set of terms included in the text or a pattern of terms included in the text in a manner that is the same as or similar to that described with regard to FIGS. 1A-1F.

As further shown in FIG. 6, process 600 may include classifying the electronic issue ticket into an issue category, of a set of issue categories, based on the set of terms or the pattern of terms included in the text (block 620). For example, the problem detection platform (e.g., using computing resource 234, processor 320, and/or the like) may classify the electronic issue ticket into an issue category, of a set of issue categories, based on the set of terms or the pattern of terms included in the text in a manner that is the same as or similar to that described with regard to FIGS. 1A-1F.

As further shown in FIG. 6, process 600 may include detecting a possible underlying problem among the various computing devices based on a respective counter for a set of thresholds (block 630). For example, the problem detection platform (e.g., using computing resource 234, processor 320, and/or the like) may detect a possible underlying problem among the various computing devices based on a respective counter for a set of thresholds in a manner that is the same as or similar to that described with regard FIGS. 1A-1F.

As further show in FIG. 6, process 600 may include generating an electronic problem ticket for the possible underlying problem after detecting the possible underlying problem (block 640). For example, the problem detection platform (e.g., using computing resource 234, processor 320, and/or the like) may generate an electronic problem ticket for the possible underlying problem after detecting the possible underlying problem in a manner that is the same as or similar to that described with regard to FIGS. 1A-1F.

As further shown in FIG. 6, process 600 may include appending the electronic problem ticket with information related to the electronic issue ticket or one or more other electronic issue tickets classified in a same category as the electronic issue ticket (block 650). For example, the problem detection platform (e.g., using computing resource 234, processor 320, and/or the like) may append the electronic problem ticket with information related to the electronic issue ticket or one or more other electronic issue tickets classified in a same category as the electronic issue ticket in a manner that is the same as or similar to that described with regard to FIGS. 1A-1F.

As further shown in FIG. 6, process 600 may include performing one or more actions after appending the electronic problem ticket with the information (block 660). For example, the problem detection platform (e.g., using computing resource 234, processor 320, and/or the like) may perform one or more actions after appending the electronic problem ticket with the information in a manner that is the same as or similar to that described with regard to FIGS. 1A-1F.

Process 600 may include additional implementations, such as any single implementation or any combination of implementations described below and/or in connection with one or more other processes described elsewhere herein.

In some implementations, the electronic issue ticket may be associated with an issue related to a computing device. In some implementations, the set of issue categories may be related to various issues associated with various computing devices. In some implementations, the set of thresholds may be associated with the issue category. In some implementations, the one or more actions may include providing the electronic problem ticket to a client device associated with a particular team associated with an information technology (IT) support center.

In some implementations, the problem detection platform may determine that the respective counter satisfies the set of thresholds during a respective time period after classifying the electronic issue ticket, and may detect the possible underlying problem after determining that the respective counter satisfies the set of thresholds during the respective time period. In some implementations, the problem detection platform may monitor the respective counter to determine whether the respective counter satisfies the set of thresholds after classifying the electronic issue ticket. In some implementations, the problem detection platform may fix the issue related to the computing device based on the possible underlying problem. In some implementations, the problem detection platform may receive the electronic issue ticket from the computing device and via an IT ticketing system prior to processing the text included in the electronic issue ticket. In some implementations, the problem detection platform may send a set of instructions to the IT ticketing system to modify operations of the IT ticketing system based on the possible underlying problem.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the problem detection platform can facilitate detection and/or resolution of a possible underlying problem among thousands, millions, or more computing device (e.g., associated with an organization). This facilitates faster and/or more efficient resolution of possible underlying problems and/or resolution of possible underlying problems in a manner not previously possible. In addition, this provides a tool that can be deployed to an organization to improve resolution of computing device-related issues (e.g., by reducing or eliminating repetitive issues, facilitating automatic resolution of issues, and/or the like), thereby improving operations of the organization. Further, this conserves resources related to resolving computing device-related issues, thereby freeing resources that can be deployed in other areas of the organization.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, an electronic issue ticket related to an issue associated with a computing device;
   processing, by the device, content of the electronic issue ticket utilizing a text processing technique to identify a set of terms included in the content or a pattern of terms included in the content,
      wherein the content includes:
         text included in the electronic issue ticket,
         a categorization of the electronic issue ticket,
         a priority of the electronic issue ticket, or
         an identity of the computing device associated with the electronic issue ticket;
   classifying, by the device, the electronic issue ticket into an issue category, of a set of issue categories, based on the set of terms or the pattern of terms included in the content of the electronic issue ticket,
      wherein the set of issue categories is related to various issues associated with various computing devices;
   incrementing, by the device and based on classifying the electronic issue ticket into the issue category, a respective counter associated with the issue category;
   monitoring, by the device, the respective counter and a set of thresholds associated with the issue category after classifying the electronic issue ticket,
      wherein each threshold, of the set of thresholds, is associated with a different time period;
   detecting, by the device and based on the respective counter satisfying a threshold, of the set of thresholds, for a respective different time period specified by the threshold, a possible underlying problem among the various computing devices after monitoring the respective counter;
   generating, by the device and based on detecting the possible underlying problem, an electronic problem ticket for the possible underlying problem after detecting the possible underlying problem,
      the electronic problem ticket including information identifying a quantity of issue tickets received for the issue category within the respective different time period associated with the threshold;
   appending, by the device, the electronic problem ticket with information related to the electronic issue ticket or one or more other electronic issue tickets classified in a same category as the electronic issue ticket; and
   performing, by the device, one or more actions related to the possible underlying problem after appending the electronic problem ticket with the information.

2. The method of claim 1, wherein receiving the electronic issue ticket comprises:
   receiving the electronic issue ticket from an information technology (IT) ticketing system.

3. The method of claim 1, further comprising:
   performing a match of the pattern of terms included in the content to a set of patterns of terms after processing the content; and
   wherein classifying the electronic issue ticket comprises:
      classifying the electronic issue ticket into the issue category based on the match.

4. The method of claim 3, further comprising:
   performing another match of the set of terms included in the content and another set of terms after processing the content; and
   classifying the electronic issue ticket into an issue sub-category based on the other match.

5. The method of claim 1, wherein the set of thresholds includes:
   a first threshold based on a historical average quantity of electronic issue tickets received for the issue category,
   a second threshold based on the historical average quantity of electronic issue tickets and one standard deviation of the historical average quantity of electronic issue tickets for the issue category,
   a third threshold based on the historical average quantity of electronic issue tickets and two standard deviations of the historical average quantity of electronic issue tickets for the issue category, or
   a fourth threshold based on the historical average quantity of electronic issue tickets and three standard deviations of the historical average quantity of electronic issue tickets for the issue category.

6. The method of claim 1, wherein the information related to the electronic issue ticket or the one or more other electronic issue tickets identifies at least one of:
  a respective identifier for the electronic issue ticket or the one or more other electronic issue tickets,
  another respective identifier for a respective computing device related to the electronic issue ticket or the one or more other electronic issue tickets,
  a respective timestamp for the electronic issue ticket or the one or more other electronic issue tickets,
  a link to the electronic issue ticket or the one or more other electronic issue tickets, or
  another link to a respective resolution ticket for the electronic issue ticket or the one or more other electronic issue tickets.

7. The method of claim 1, wherein performing the one or more actions includes:
  downloading software for the computing device based on the possible underlying problem; and
  installing the software on the computing device after downloading the software.

8. A device, comprising:
  one or more memories; and
  one or more processors, communicatively coupled to the one or more memories, to:
    process text included in an electronic issue ticket utilizing a text processing technique to identify a set of terms included in the text or a pattern of terms included in the text,
      wherein the electronic issue ticket is related to an issue associated with a computing device;
    classify the electronic issue ticket into an issue category, of a set of issue categories, based on the set of terms or the pattern of terms included in the text,
      wherein the set of issue categories is related to various issues associated with various computing devices;
    increment, based on classifying the electronic issue ticket into the issue category, a counter associated with the issue category;
    monitor the counter and a set of thresholds associated with the issue category to detect satisfaction of one or more of the set of thresholds,
      wherein each threshold, of the set of thresholds, is associated with a different time period;
    detect, based on the counter satisfying a threshold, of the set of thresholds, for a respective different time period specified by the threshold, a possible underlying problem among the various computing devices after monitoring the counter;
    generate, based on detecting the possible underlying problem, an electronic problem ticket for the possible underlying problem after detecting the possible underlying problem,
      the electronic problem ticket including information identifying a quantity of issue tickets received for the issue category within the respective different time period associated with the threshold;
    append the electronic problem ticket with information related to the electronic issue ticket or one or more other electronic issue tickets classified in a same issue category as the electronic issue ticket; and
    perform one or more actions after appending the electronic problem ticket with the information.

9. The device of claim 8, wherein the one or more processors, when classifying the electronic issue ticket, are to:
  classify the electronic issue ticket into the issue category based on the pattern of terms included in the text and into an issue sub-category based on the set of terms included in the text.

10. The device of claim 8, wherein the one or more processors are further to:
  receive the electronic issue ticket from an information technology (IT) ticketing system prior to processing the text included in the electronic issue ticket.

11. The device of claim 8, wherein the one or more processors are further to:
  determine that the counter satisfies the threshold during the respective different time period.

12. The device of claim 8, wherein the one or more processors, when performing the one or more actions, are to:
  power on another computing device based on the possible underlying problem, or
  power down the computing device based on the possible underlying problem.

13. The device of claim 8, wherein the one or more processors, when performing the one or more actions, are to:
  identify a particular team within an information technology (IT) support center after appending the electronic problem ticket; and
  transmit the electronic problem ticket to a client device associated with the particular team after identifying the particular team.

14. The device of claim 8, wherein the set of thresholds includes:
  a first threshold based on a historical average quantity of electronic issue tickets received for the issue category,
  a second threshold based on the historical average quantity of electronic issue tickets and one standard deviation of the historical average quantity of electronic issue tickets for the issue category,
  a third threshold based on the historical average quantity of electronic issue tickets and two standard deviations of the historical average quantity of electronic issue tickets for the issue category, or
  a fourth threshold based on the historical average quantity of electronic issue tickets and three standard deviations of the historical average quantity of electronic issue tickets for the issue category.

15. A non-transitory computer-readable medium storing instructions, the instructions comprising:
  one or more instructions that, when executed by one or more processors, cause the one or more processors to:
    process text included in an electronic issue ticket utilizing a text processing technique to identify a set of terms included in the text or a pattern of terms included in the text,
      wherein the electronic issue ticket is associated with an issue related to a computing device;
    classify the electronic issue ticket into an issue category, of a set of issue categories, based on the set of terms or the pattern of terms included in the text,
      wherein the set of issue categories is related to various issues associated with various computing devices;
    increment, based on classifying the electronic issue ticket into the issue category, a respective counter associated with the issue category;
    detect a possible underlying problem among the various computing devices based on the respective counter satisfying one or more thresholds of a set of thresholds, wherein the set of thresholds is associated with the issue category, wherein each threshold, of the set of thresholds, is associated with a different time period, and wherein the respective counter satisfies a threshold, of the set of thresholds, for a respective different time period specified by the threshold;

generate, based on detecting the possible underlying problem, an electronic problem ticket for the possible underlying problem after detecting the possible underlying problem, the electronic problem ticket including information identifying a quantity of issue tickets received for the issue category within the respective different time period associated with the threshold;

append the electronic problem ticket with information related to the electronic issue ticket or one or more other electronic issue tickets classified in a same category as the electronic issue ticket; and perform one or more actions after appending the electronic problem ticket with the information, wherein the one or more actions include:

providing the electronic problem ticket to a client device associated with a particular team associated with an information technology (IT) support center.

16. The non-transitory computer-readable medium of claim 15, wherein the one or more instructions, when executed by the one or more processors, further cause the one or more processors to:

determine that the respective counter satisfies the threshold during the respective time period and after classifying the electronic issue ticket; and wherein the one or more instructions, that cause the one or more processors to detect the possible underlying problem, cause the one or more processors to:

detect the possible underlying problem after determining that the respective counter satisfies the threshold during the respective time period.

17. The non-transitory computer-readable medium of claim 15, wherein the one or more instructions, when executed by the one or more processors, further cause the one or more processors to:

monitor the respective counter to determine whether the respective counter satisfies the set of thresholds after classifying the electronic issue ticket.

18. The non-transitory computer-readable medium of claim 15, wherein the one or more instructions, that cause the one or more processors to perform the one or more actions, cause the one or more processors to:

fix the issue related to the computing device based on the possible underlying problem.

19. The non-transitory computer-readable medium of claim 15, wherein the one or more instructions, when executed by the one or more processors, further cause the one or more processors to:

receive the electronic issue ticket from the computing device and via an IT ticketing system prior to processing the text included in the electronic issue ticket.

20. The non-transitory computer-readable medium of claim 19, wherein the one or more instructions, that cause the one or more processors to perform the one or more actions, cause the one or more processors to:

send a set of instructions to the IT ticketing system to modify operations of the IT ticketing system based on the possible underlying problem.

* * * * *